(No Model.)
2 Sheets—Sheet 1.

G. W. TOWAR, Jr.
CENTRIFUGAL MACHINE FOR EMULSIFYING LIQUIDS.

No. 474,880.
Patented May 17, 1892.

(No Model.) 2 Sheets—Sheet 2.

G. W. TOWAR, Jr.
CENTRIFUGAL MACHINE FOR EMULSIFYING LIQUIDS.

No. 474,880. Patented May 17, 1892.

WITNESSES

INVENTOR
Geo. W. Towar Jr.

UNITED STATES PATENT OFFICE.

GEORGE W. TOWAR, JR., OF DETROIT, MICHIGAN.

CENTRIFUGAL MACHINE FOR EMULSIFYING LIQUIDS.

SPECIFICATION forming part of Letters Patent No. 474,880, dated May 17, 1892.

Application filed December 1, 1890. Serial No. 373,188. (No model.)

*To all whom it may concern:*

Be it known that I, GEORGE W. TOWAR, Jr., a citizen of the United States, residing at Detroit, in the county of Wayne and State of Michigan, have invented a new and useful Improvement in Centrifugal Machines for Emulsifying Liquids, of which the following is a specification.

The object of this invention is a machine employed to produce an emulsion or mixture of butter-oil and milk, producing a mixture which has the properties of cream, from which in turn butter may be produced in the ordinary way, or the product may be used in the form of cream as the cream is ordinarily used. Butter produced in the ordinary way may contain large quantities of milk and water which accelerate the souring or turning rancid of the butter, and it has become common to separate the fat particles entirely from the milky or watery particles, producing what is called "butter-oil" or "butter-fat," for the purpose of storing the same and keeping it in a sweet condition; but this butter-oil does not possess the agreeable flavor, nor does it have the pleasing appearance of butter, and in order to restore to the butter-oil both the taste and the appearance it is desirable to incorporate with it again a proper amount of milk and water, and to incorporate it in a condition as nearly like that of butter made in the usual way as possible. In order to attain this end, I make an emulsion of the proper proportions of butter-fat and sweet milk, thus producing a cream which may be used as a cream or from which butter may be made in the ordinary way, and in making this emulsion I employ the machinery herein shown and described, and for the purpose specified.

Figure 1:
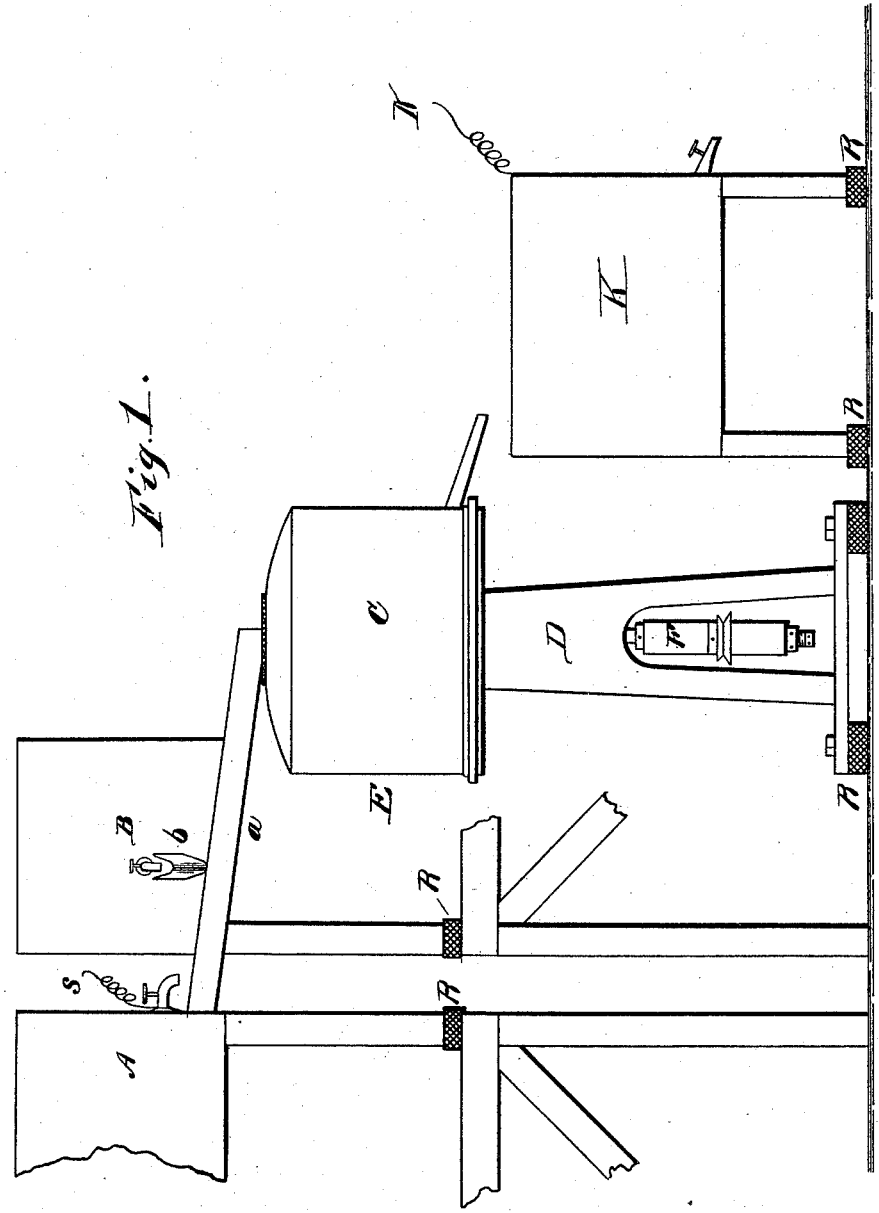
Figure 2:
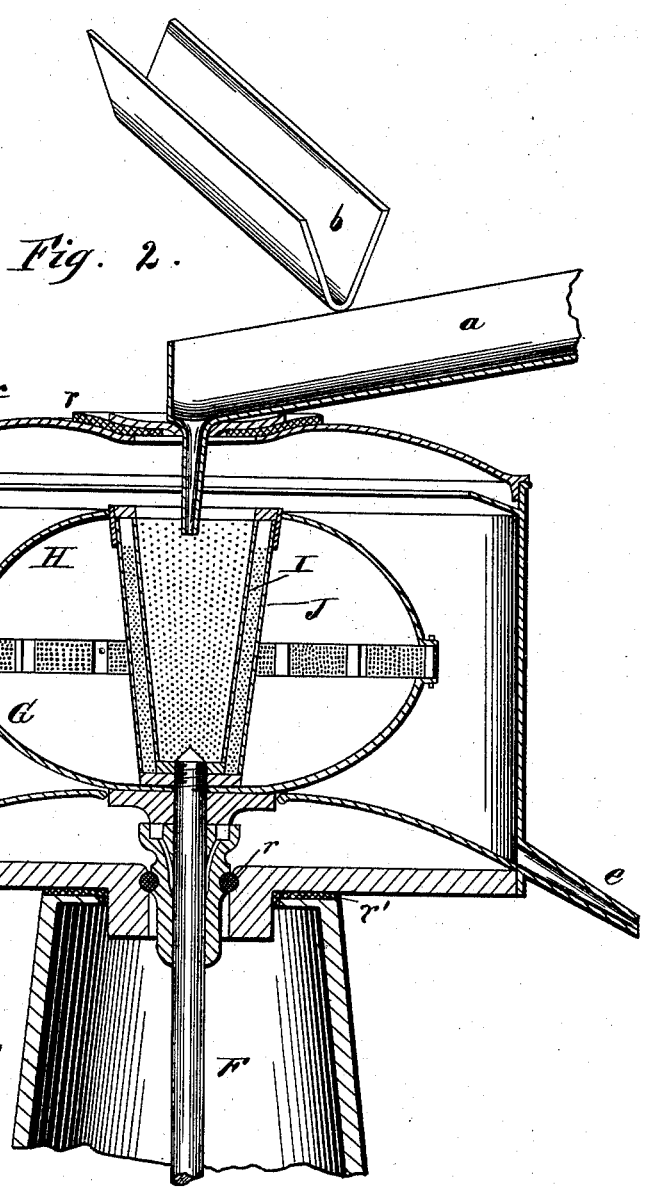

Figure 1 is a side elevation showing the emulsifier, the storage-tanks from which milk and butter-fat are fed into it, and the tank into which the produce is delivered. Fig. 2 shows a section of the emulsifier.

Milk at a temperature of about 98° is contained in the tank A, and butter-oil at the same temperature in the tank B, from both of which there are delivery-spouts, that from B leading into that from A, and that from A leading into the emulsifier C. The spout or trough $b$ is not in contact with the spout or trough $a$, for reasons that will be hereinafter described.

The emulsifier C consists of the standard D, supporting a casing E, which is fixed with relation to D, and also supporting an upright shaft or spindle F, upon the upper end of which, within the case E, is a bowl G, having a cover H supported above it, there being a small opening $g$ between the lower edge of the cover H and the upper edge of the bowl G. This opening may be continuous, broken only by the bolts necessary to support the parts, or it may be partially closed, if desired, by perforated metal or metal netting, as indicated. Around the center of the bowl and cover G H are one or more cups, of which the side walls are filled with fine perforations. The number of these cups may be varied; but I find that with a speed of five thousand revolutions a minute a very complete emulsion is produced with a single cup. The liquid oil and milk flowing from the tanks A B in the proportions to produce the proper mixture drop together into the interior perforated cup I, and in consequence of the rapid rotation of the cup I the two combined are thrown out in the form of a fine spray through the perforated walls of that cup and the perforated walls of the cup J, and, dropping on the inner surface of the bowl G, continue, in consequence of the centrifugal motion of G, to pass upward along the interior surface of the bowl G until in a perfectly-commingled state. The mass, in the condition of a cream, passes through the opening $g$ and into the interior of the tank E, whence it escapes through the spout $a$ to the tank K in a condition for use.

Within the case E is a false bottom $d$, rising from the lower edge of the case E, toward the center of the bottom of the bowl G, which is elevated above the bottom of the tank C. This bottom $d$ forms a coned surface that guides any particles of cream away from the center and finally toward the exit-spout $e$ and prevents any accumulation of the matter on the inside of the bottom of the case E. The cover $f$ and the bottom $d$ and the bowl G and cover H are all removable, so as to be readily cleansed. In connection with this centrifugal emulsifier I sometimes employ an electric current which is forced through the liquid while the liquid is in transit from the tanks to the final receptacle K. To enable me to force the current through the liquid, all the parts are mounted on insulating-blocks R R, and the metallic parts are insulated from one another by means of insulating-packing $r$ $r'$. The current passes from a generator to which the apparatus is connected by the line-wires $s$ $k$ through the flowing liquid. I have found that the result is much more satisfactory when the electricity is applied in this way than it is when the emulsion is formed without the use of electricity, the product in either case being a useful formation of cream; but in the one case being a more uniform mixture than in the other.

Having thus explained my invention, what I claim as novel, and desire to have secured to me by Letters Patent, is—

1. In an emulsifier, the combination of a fixed casing having an outlet-pipe, a spherical bowl adapted to rotate within said casing and provided with an annular opening around its circumference horizontally, and a perforated cup or cups within said bowl and arranged to rotate with said bowl, and a conduit adapted to conduct oil and milk into said inner cup, substantially as and for the purpose described.

2. In an emulsifier, the combination of a fixed casing having an outlet-pipe, a spherical bowl adapted to rotate within said casing and provided with an annular opening around its circumference horizontally, a perforated cup or cups centrally located in said bowl and adapted to rotate therewith, a cone-shaped bottom to said case, and a conduit leading into said inner cup, adapted to receive oil and milk from separate tanks and deliver them to said cup partially mixed, substantially as described.

3. The combination of a milk-tank, a butter-oil tank, conduits leading from said tanks into an emulsifier, consisting of an outer casing, a spherical bowl adapted to rotate in said casing and provided with an annular opening around the circumference of said bowl horizontally, and a perforated cup centrally located in said bowl and adapted to rotate therewith and receive the supply of butter-oil and milk, substantially as described.

4. In an emulsifier, the combination of an outer casing, a spherical bowl adapted to rotate within said casing and provided with an annular opening around its circumference horizontally, said opening fitted with a wire screen, a cup or cups centrally located in said bowl and adapted to rotate therewith, and a conduit adapted to supply milk and butter-oil to said inner cup, substantially as described.

GEORGE W. TOWAR, JR.

Witnesses:
 EFFIE I. CROFT,
 CHARLES F. BURTON.